US009172176B2

(12) United States Patent
Chen et al.

(10) Patent No.: US 9,172,176 B2
(45) Date of Patent: Oct. 27, 2015

(54) PANEL MOUNT DIGITAL CARD CONNECTOR ASSEMBLY (71) Applicant: Genesis Technology USA, Inc., Norcross, GA (US)

(72) Inventors: Tao Chuan Chen, Duluth, GA (US); Ronald L. Hodge, Flowery Branch, GA (US); William Gray Vallely, Johns Creek, GA (US)

(73) Assignee: GENESIS TECHNOLOGY USA, INC., Norcross, GA (US)

( * ) Notice: Subject to any disclaimer, the term of this patent is extended or adjusted under 35 U.S.C. 154(b) by 28 days.

(21) Appl. No.: 14/151,489

(22) Filed: Jan. 9, 2014

(65) Prior Publication Data

US 2014/0199877 A1    Jul. 17, 2014

Related U.S. Application Data (60) Provisional application No. 61/752,783, filed on Jan. 15, 2013.

(51) Int. Cl.
*H01R 13/73*        (2006.01)
*H02B 1/01*         (2006.01)
(Continued)

(52) U.S. Cl.
CPC ............ *H01R 13/582* (2013.01); *G06K 7/0021* (2013.01); *H01R 13/6596* (2013.01); *H01R 13/73* (2013.01); *H01R 13/748* (2013.01); *H02B 1/01* (2013.01)

(58) Field of Classification Search
USPC ......... 439/564, 562, 569, 544, 545, 549, 565, 439/567, 572, 573, 607.28, 607.44, 939, 62, 439/359
See application file for complete search history.

(56) References Cited

U.S. PATENT DOCUMENTS 5,380,223 A     1/1995   Marsh et al.
5,514,000 A     5/1996   Krause et al.
(Continued)

FOREIGN PATENT DOCUMENTS

CN      2256175       6/1997
CN      2376104       4/2000
CN      101515686     8/2009

OTHER PUBLICATIONS

Translated Chinese Office Action mailed Jul. 31, 2015 for Chinese patent application No. 201410139173.1, a counterpart foreign application of U.S. Appl. No. 14/151,489, 14 pages.

*Primary Examiner* — Abdullah Riyami
*Assistant Examiner* — Harshad Patel
(74) *Attorney, Agent, or Firm* — Lee & Hayes, PLLC; Charles L. Warner (57) ABSTRACT A digital card connector assembly (10) for mounting to a panel (100) having a slot (101) whereby a digital card (90) may be inserted into the digital card connector assembly to communicate with an electronic device (95). The digital card connector assembly includes a connector body (10), a cable assembly (50), and a radio frequency (RF) shield (30). The connector body has a plurality of electrical contacts configured to make contact with a plurality of electrical contacts of the digital card when the digital card is inserted into the digital card connector assembly. The cable assembly has a plurality of electrical conductors (87) electrically connected to the plurality of electrical contacts of the connector body. The RF shield is affixed to the connector body and is configured to make electrical contact with the panel when the digital card connector assembly is mounted to the panel.

6 Claims, 15 Drawing Sheets (51) Int. Cl.
*H01R 13/58* (2006.01)
*G06K 7/00* (2006.01)
*H01R 13/6596* (2011.01)
*H01R 13/74* (2006.01)

(56) References Cited

U.S. PATENT DOCUMENTS

| | | | |
|---|---|---|---|
| 5,525,074 A | 6/1996 | Tsuji et al. | |
| 5,632,648 A | 5/1997 | Liu | |
| 5,667,407 A | 9/1997 | Frommer et al. | |
| 5,797,771 A | 8/1998 | Garside | |
| 6,165,006 A | 12/2000 | Yeh et al. | |
| 6,238,242 B1 | 5/2001 | Hwang | |
| 6,547,591 B2 * | 4/2003 | Okabe et al. | 439/557 |
| 7,121,878 B2 * | 10/2006 | Chang et al. | 439/564 |
| 7,121,879 B1 * | 10/2006 | Chou et al. | 439/564 |
| 7,525,818 B1 | 4/2009 | McAlonis et al. | |
| 8,014,165 B2 | 9/2011 | Hamner et al. | |
| 8,360,796 B2 * | 1/2013 | Daubigney | 439/345 |
| 8,500,485 B2 * | 8/2013 | Fu et al. | 439/545 |
| 2003/0008554 A1 * | 1/2003 | Chang | 439/544 |
| 2004/0078961 A1 * | 4/2004 | Chen et al. | 29/739 |
| 2006/0025014 A1 * | 2/2006 | Spink | 439/607 |
| 2006/0046563 A1 * | 3/2006 | Enami et al. | 439/564 |
| 2006/0199429 A1 * | 9/2006 | Chang et al. | 439/564 |

* cited by examiner

PANEL MOUNT DIGITAL CARD CONNECTOR ASSEMBLY

CROSS-REFERENCE TO RELATED APPLICATION

This application claims the priority of U.S. Provisional Patent Application No. 61/752,783, filed Jan. 15, 2013, entitled "Panel Mount Secure Digital Card Reader Assembly," the entire disclosure and contents of which are hereby incorporated by reference herein.

SUMMARY

A digital card connector assembly for mounting to a panel having a slot whereby a digital card may be inserted into the digital card connector assembly to communicate with an electronic device. The digital card connector assembly includes a connector body, a cable assembly, and a radio frequency (RF) shield. The connector body has a plurality of electrical contacts configured to make contact with a plurality of electrical contacts of the digital card when the digital card is inserted into the digital card connector assembly. The cable assembly has a plurality of electrical conductors electrically connected to the plurality of electrical contacts of the connector body. The RF shield is affixed to the connector body and is configured to make electrical contact with the panel when the digital card connector assembly is mounted to the panel.

DETAILED DESCRIPTION

The following Detailed Description is directed to technologies for panel mount card connector assemblies, as illustrated by exemplary digital card connector assemblies.

Figure 1:
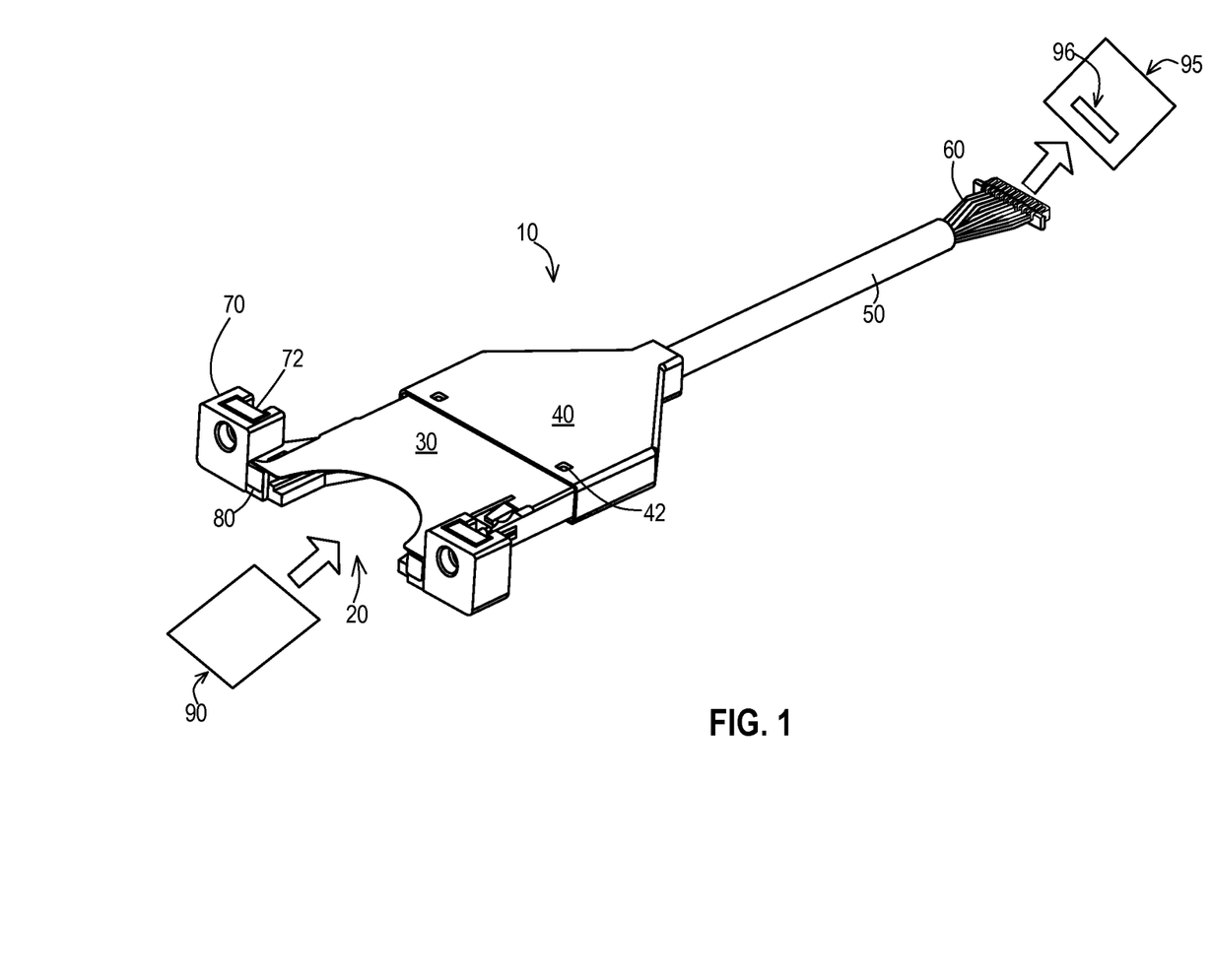
FIG. 1 is a perspective diagram showing an exemplary digital card connector assembly.

FIG. 1 shows an embodiment of an exemplary secure digital card connector assembly 10. The assembly 10 receives a digital card 90 to allow communications between the digital card 90 and an electronic device 95. The digital card 90 may be any physically small and thin electronic device or memory. Preferably, but not necessarily, the digital card 90 is a memory card. Even more preferably, the digital card 90 is a secure digital (SD) card. The electronic device 95 may be any device which is configured to read from and/or write to the digital card 90, such as, but not limited to, a digital video recorder (DVR), a computer-operated system, a printed circuit board, etc. The assembly 10 preferably comprises a digital card connector body 20, an electromagnetic interference (EMI) shield 30, a protective boot or cover 40, a connecting cable assembly 50, and an interface connector 60.

Conventionally, a card connector is mounted directly on the printed circuit board of the electronic device (95). The card connector consumes a substantial amount of space on the printed circuit board and also limits the placement and orientation of the electronic device as the card connector must be aligned with the slot 101 in the panel 100. The card connector assemblies taught and described herein remove these constraints. The relatively small interface connector 60 makes space available on a printed circuit board that was previously occupied by the board-mounted card connector, and the cable assembly 50 allows positioning of the printed circuit board independent of the slot 101 in the panel 100. The card connector assemblies taught and described herein also provide for a reduction in RF emissions. Additional advantages of the card connector assemblies taught and described herein include attachment to any surface, represented herein by the panel 100, and blind assembly to the panel 100.

Figure 4:
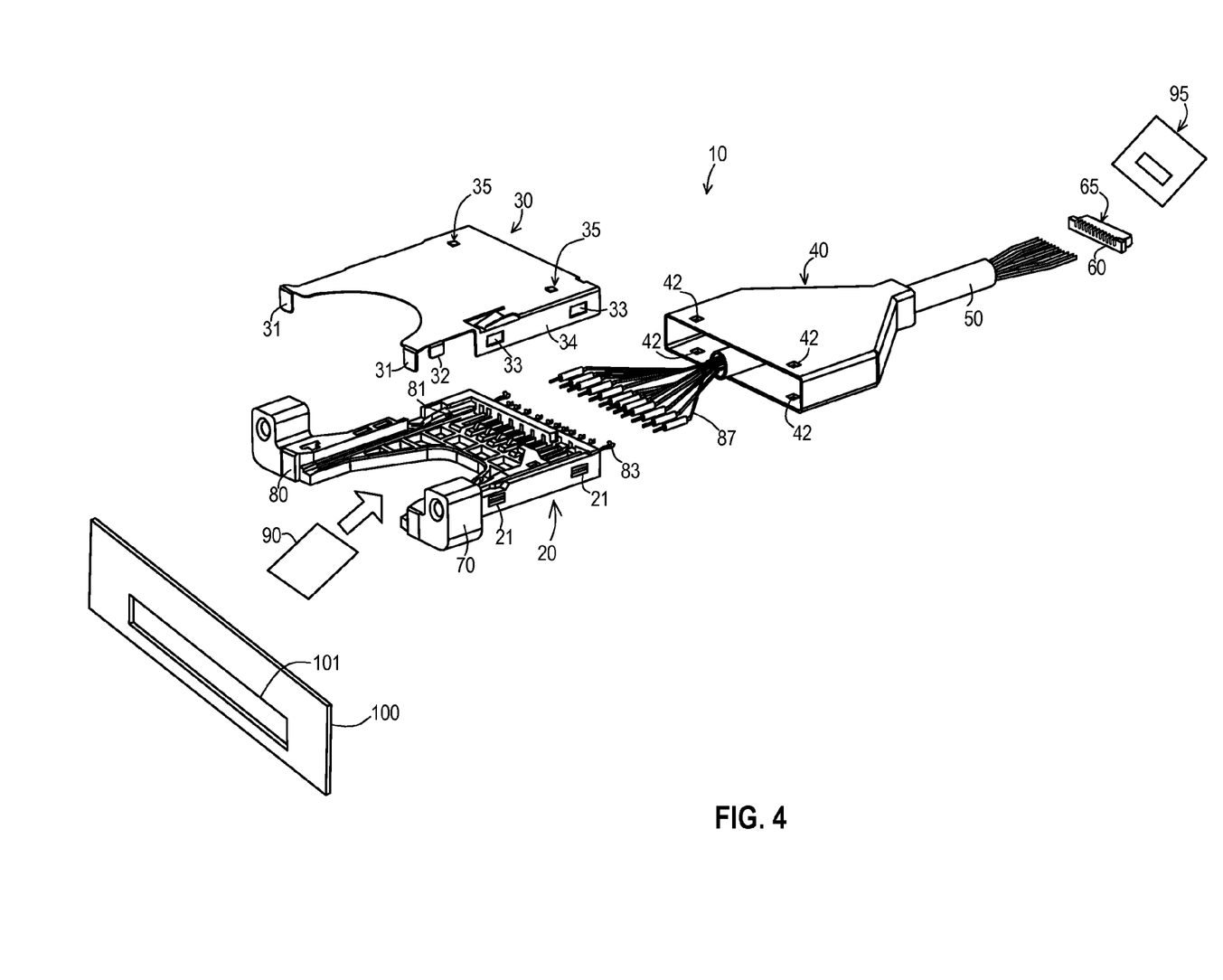
FIG. 4 is an exploded diagram of the exemplary digital card connector assembly of FIGS. 1-3.

Referring briefly to FIG. 4, the connector body 20 has a plurality of electrical contacts 81 which make electrical contact with corresponding electrical contacts (not shown) in the digital card 90, and also has a plurality of receptacles 83 for receiving electrical conductors. The cable assembly 50 has a plurality of electrical conductors 87 for communicating signals between the card 90 and the device 95. One end of the conductors 87 are affixed to the receptacles 83 by, for example, soldering, crimping, or both.

Figure 2:
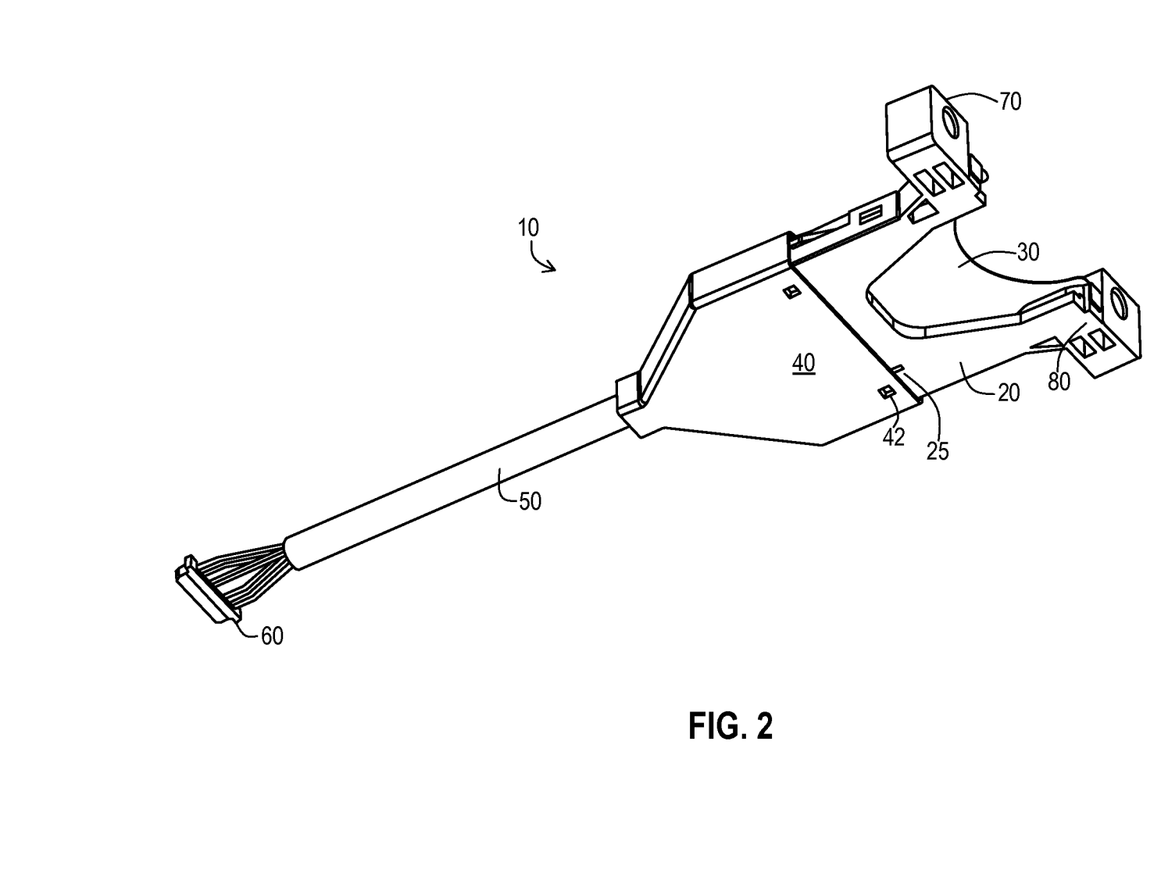
FIGS. 2 and 3 are perspective diagrams showing alternative views of the exemplary digital card connector assembly of FIG. 1.
Figure 3:
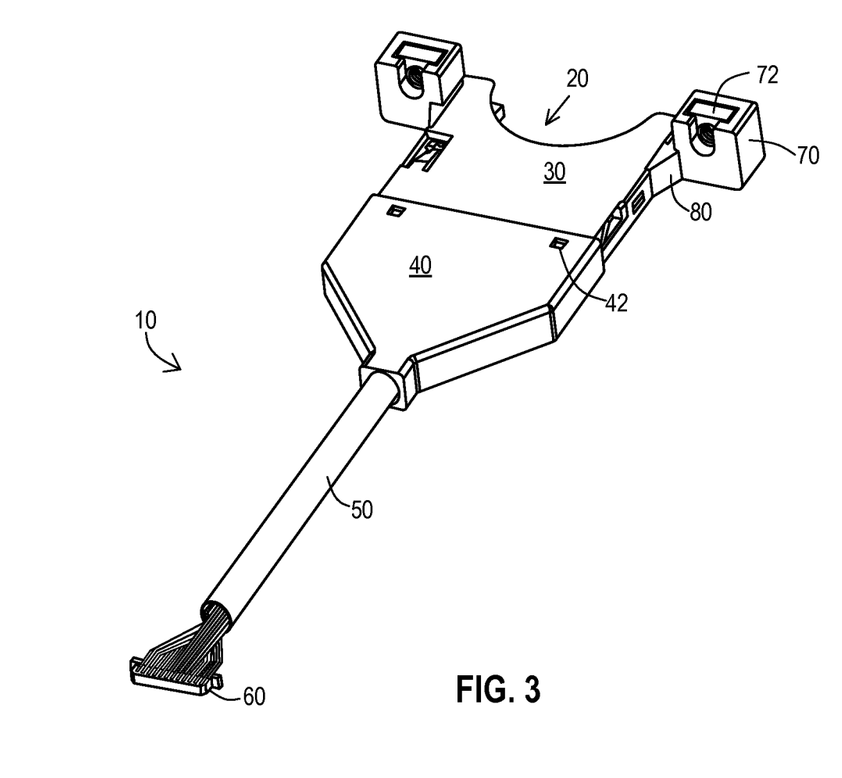

Referring briefly to FIGS. 2 and 4, the strain relief boot 40 is preferably connected to both the connector body 20 and to the shield 30. In some embodiments the strain relief boot 40 is only connected to one of the connector body 20 and/or the shield 30. The connector body 20, the shield 30, and the boot 40 preferably have retainers 25, 35, and 42, respectively. In one embodiment, one or more of retainers 42 is a slot and at least one of retainer 25 or 35 is a tab, protrusion, or other raised area. In another embodiment, one or more of retainers 42 is a tab, protrusion, or other raised area and at least one of retainer 25 or 35 is a slot. The strain relief boot 40 encompasses the cable assembly 50 and is preferably fastened to the cable assembly 50, such as, by way of example and not of limitation, by a friction fit, molding, glue, adhesive, or other convenient or desirable means, so as to prevent excessive strain or compression on the components 81, 83, and/or 87. The electrical conductors of the cable assembly 50 are connected on the other end to corresponding contacts 65 of the interface connector 60. The connector 60 is configured to be mated with a corresponding connector 96 of the electronic device 95. In an alternative embodiment, the connector 60 is not used and the electrical conductors 87 of cable assembly 50 are soldered or otherwise connected directly to conductors in the electronic device 95.

Figure 5:
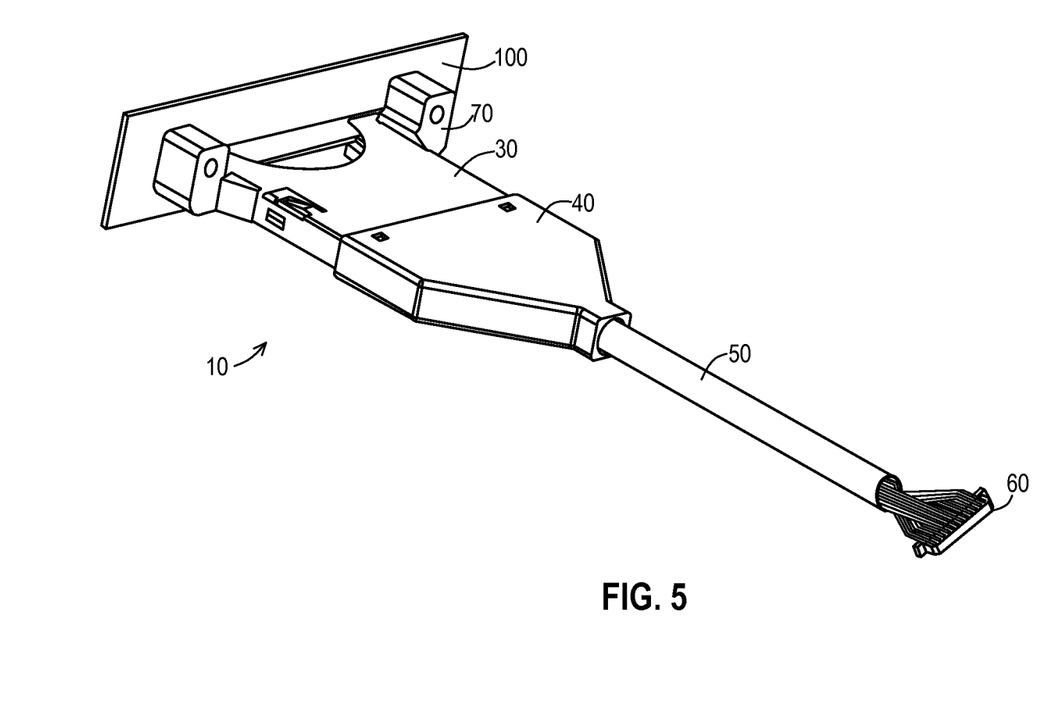
FIG. 5 is a perspective diagram showing an exemplary digital card connector assembly mounted to a panel.
Figure 6:
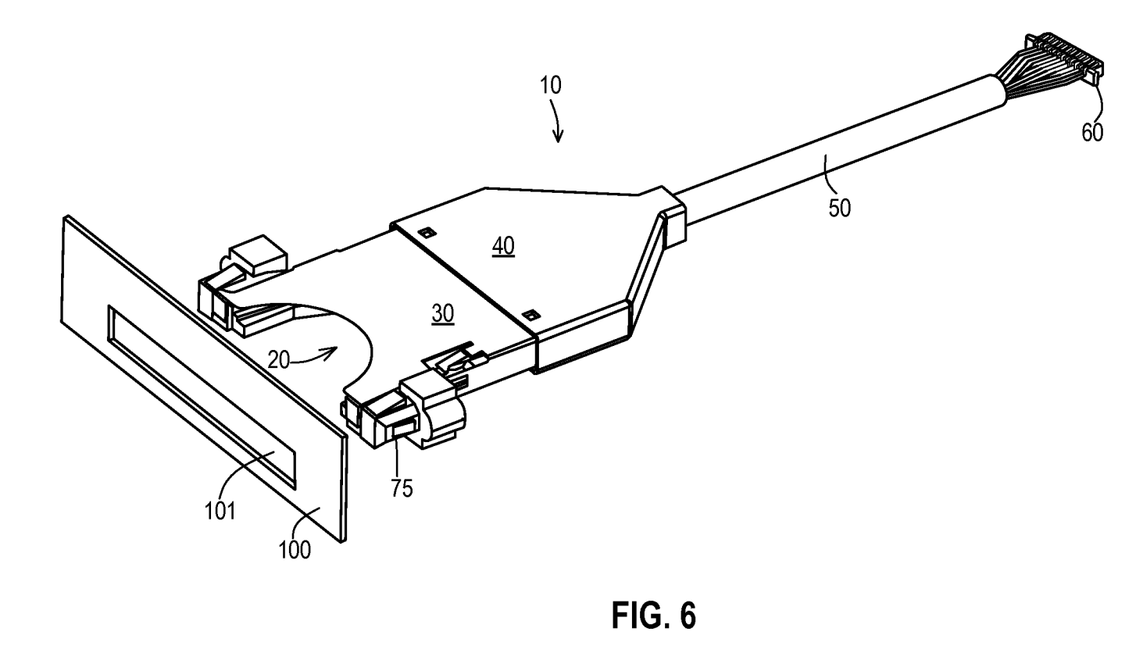
FIG. 6 is a perspective diagram showing another exemplary digital card connector assembly to be mounted to a panel.
Figure 7:
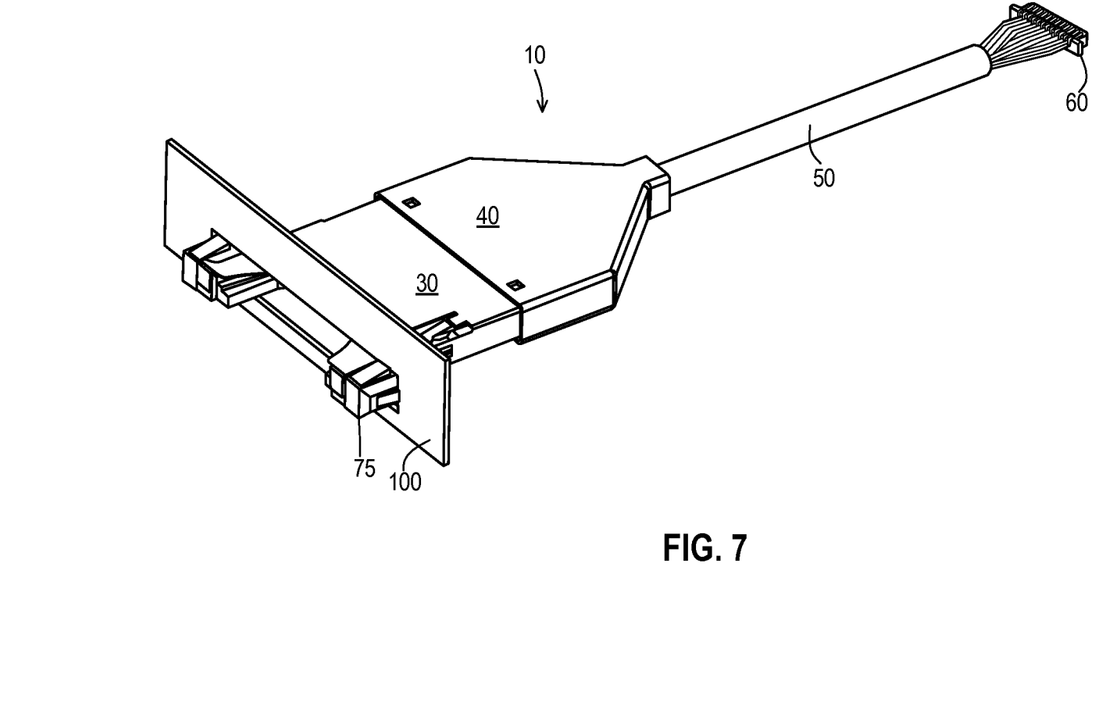
FIG. 7 is a perspective diagram showing the exemplary digital card connector assembly of FIG. 6 after being mounted to a panel.
Figure 8:
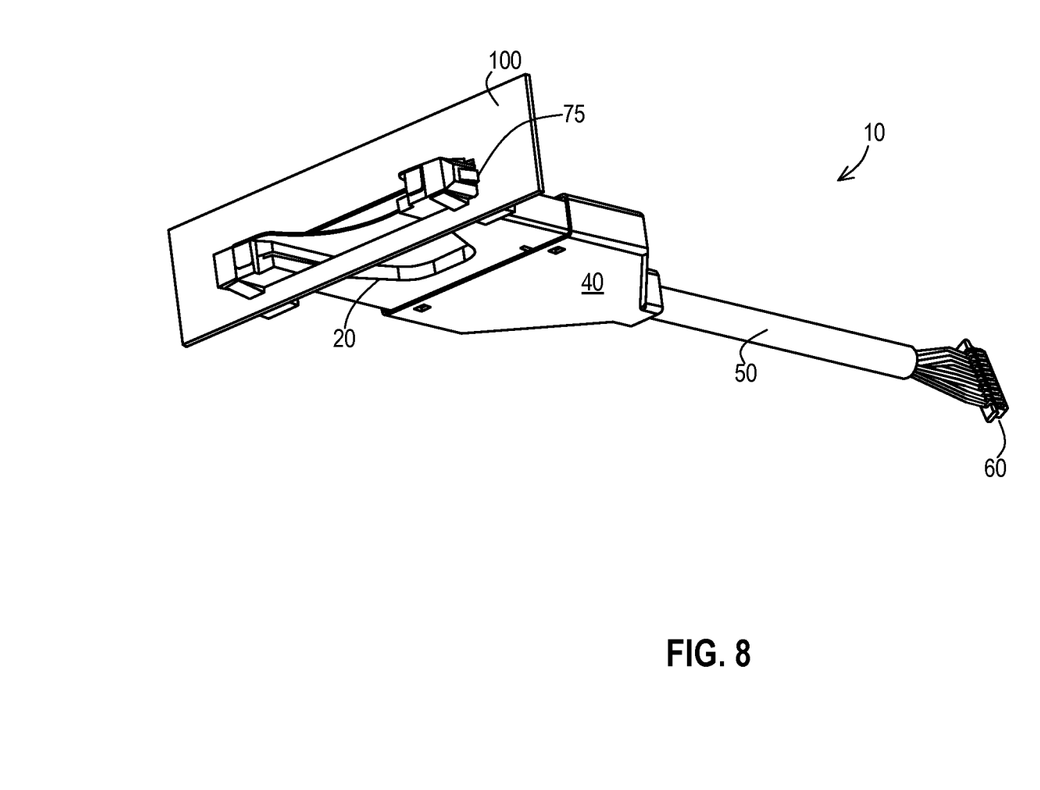
FIG. 8 is a perspective diagram showing the exemplary digital card connector assembly of FIGS. 6-7 mounted to a panel.
Figure 9:
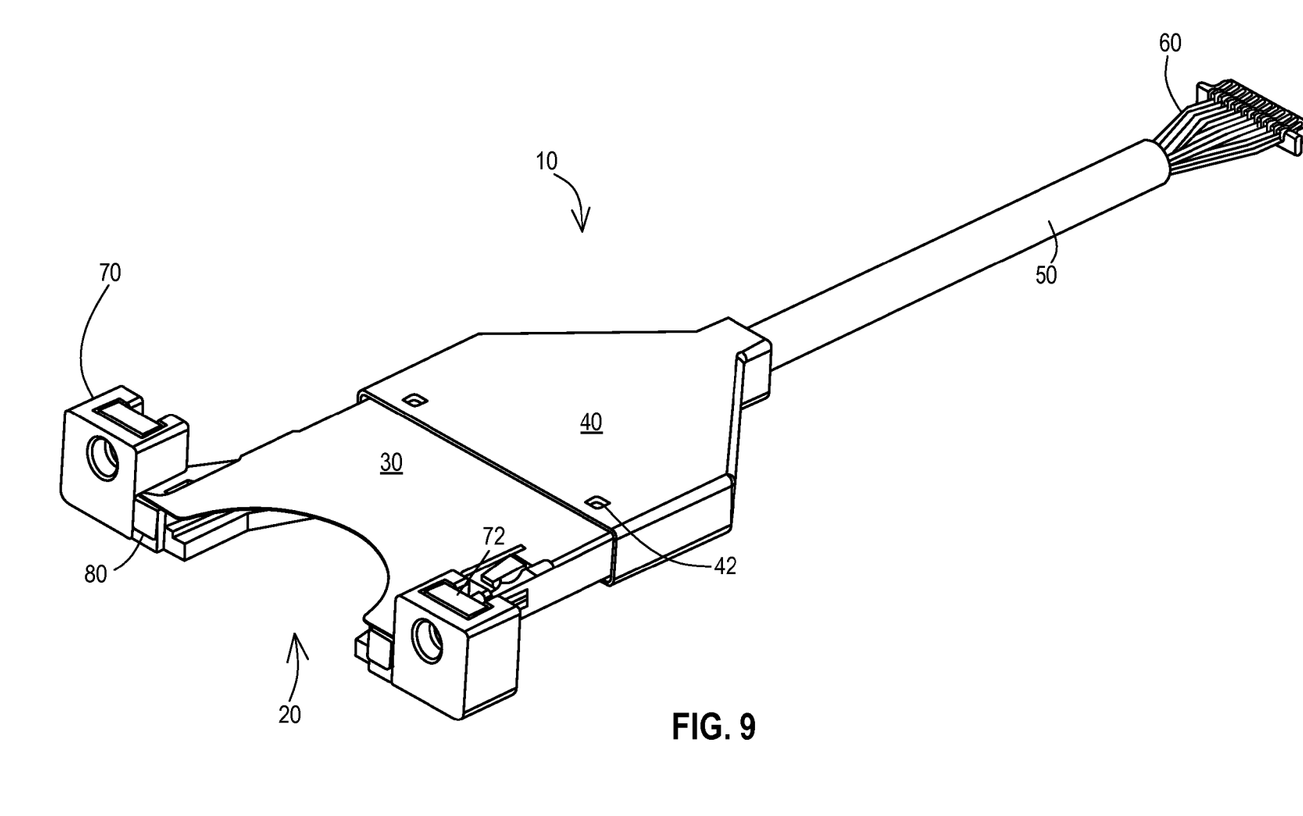
FIGS. 9-14 are perspective diagrams showing exemplary digital card connector assemblies.
Figure 10:
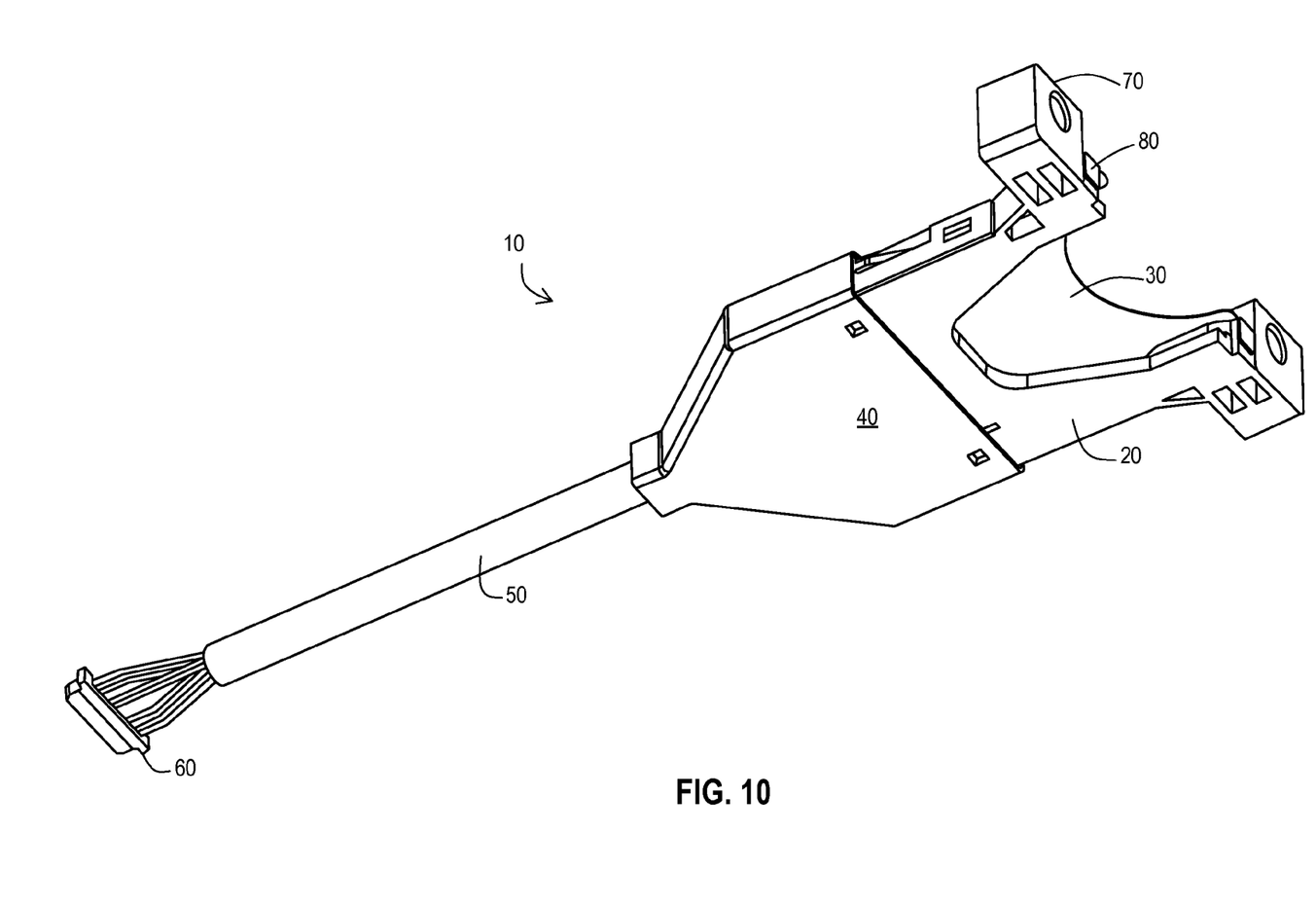
Figure 11:
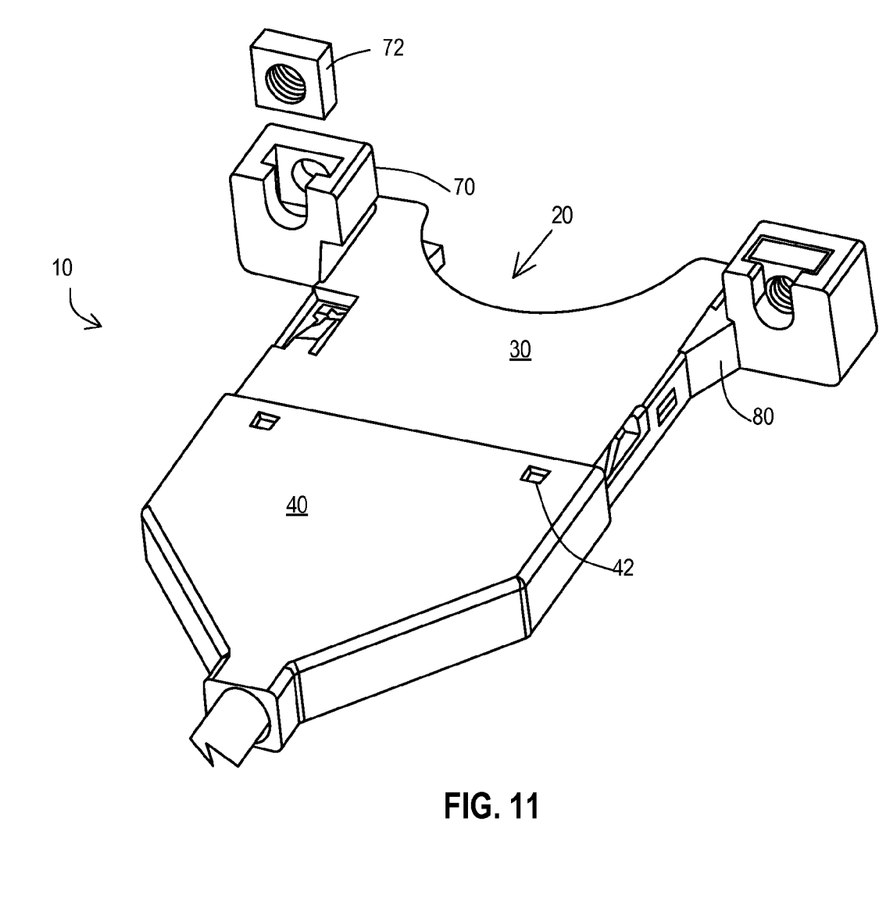
Figure 12:
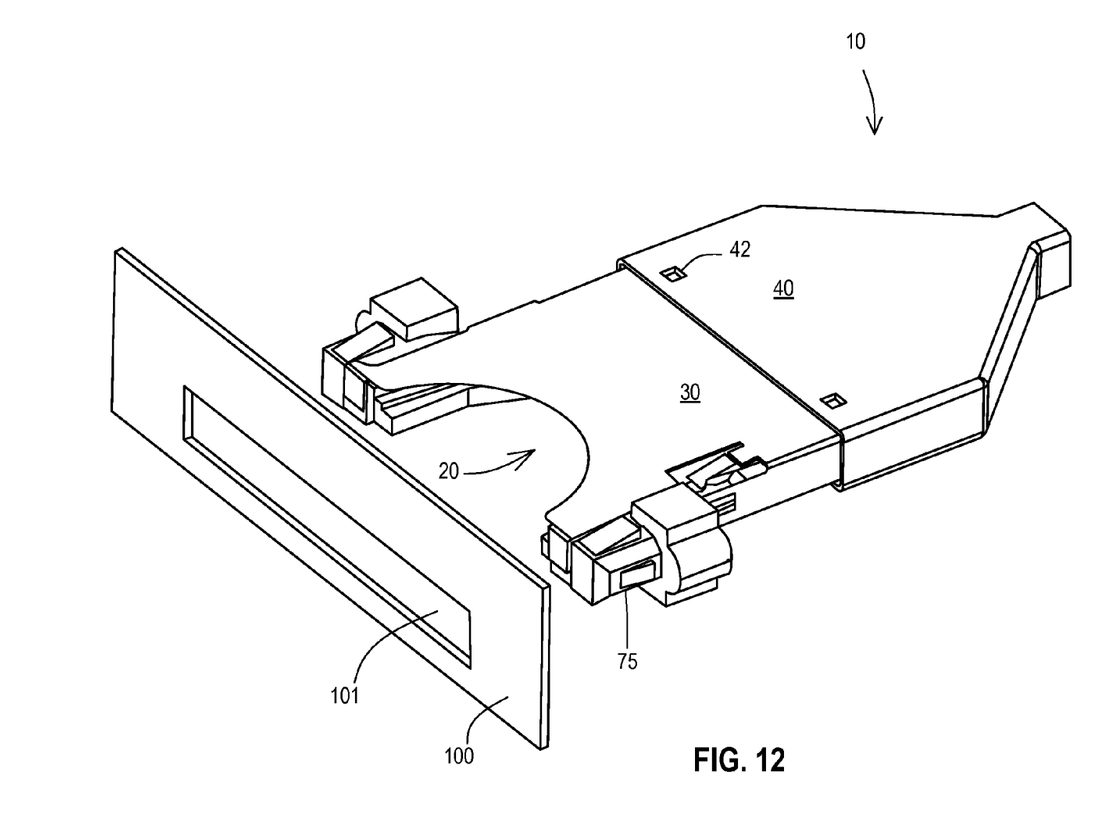
Figure 13:
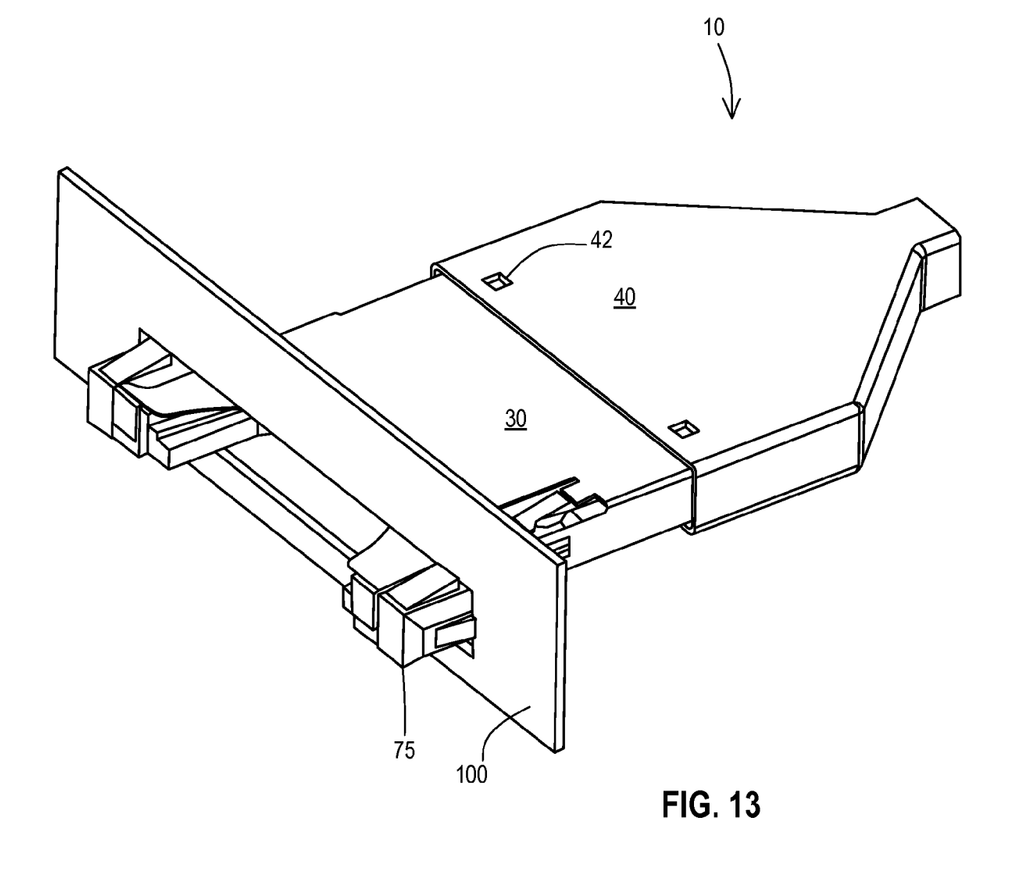
Figure 14:
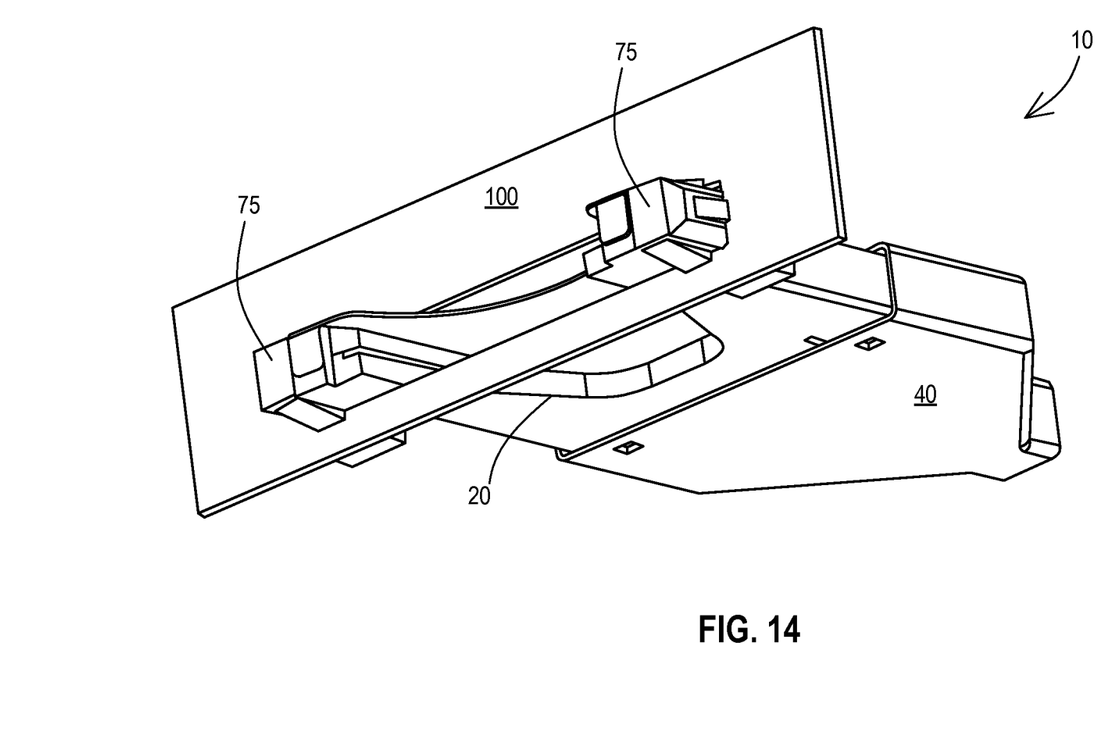

Referring briefly to FIGS. 1-14, the assembly 10 is preferably mounted in or to a structure (not shown), which has an electrically conductive or metallic wall or panel 100 and a slot or opening 101 for accommodating the assembly 10 (FIGS. 5-8 and 12-14). In one embodiment, the assembly 10 may include a screw boss 70 and a threaded insert 72 (FIGS. 1, 3, 5, 9-11). The screw boss 70 is one type of fastener or structure by which the assembly 10 may be mounted to the panel 100. For example, a threaded fastener, such as a screw, may be inserted through a hole (not shown) in the panel 100 and screwed into the threaded insert 72. It will also be appreciated that the screw boss 70 may be drilled and threaded so that the insert 72 is not used (FIGS. 4 and 5). In another embodiment, the assembly 10 may include anchor clips 75 which protrude through the slot 101 of the panel 100 and engage the panel 100 so that the assembly 10 is mounted to the panel 100 (FIGS. 6-8 and 12-14).

Turning now to FIGS. 1-4 and 9-11, the slot 101 may undesirably act as an antenna or radiator for radio frequency (RF) emissions from the card 90. To limit RF emissions through the slot, the assembly 10 preferably comprises shield 30 which is electrically grounded, such as by being electrically connected to the panel 100. In one embodiment, the shield 30 has at least one tab 31 and a shield attachment 80 is affixed to, or may be part of, the connector body 20. The shield 30 comprises a material which reduces or blocks the transmission of RF energy, such as but not limited to a conductive material. The shield attachment 80 provides a recessed area for the tab 31, and urges the tab 31 into electrical contact with the panel 100 when the connector assembly 10 is fastened or secured to the panel 100, thereby providing an electrical ground connection between the shield 30 and the panel 100.

In another embodiment the shield attachment 80 may electrically connect the shield 30 to the panel 100 through the screw boss 70. In another embodiment the shield attachment 80 may electrically connect the screw boss 70 to the connector body 20, which is electrically connected to the shield 30. In still another embodiment the shield attachment 80 may electrically connect the screw boss 70 to the shield 30, the connector body 20, and to the panel 100. If the shield 30 is configured to contact the card 90, or has one or more springs or protrusions which contact the card 90, then the shield 30 may also provide heat dissipation for the card 90.

Referring now to FIG. 4, the shield 30 preferably has a plurality of retaining mechanisms 31, 32, 33 for holding the shield 30 to the connector body 20. Tabs 31 and 32 and side panel 34 engage the front and sides of the connector body 20, and slots 33 in side panel 34 accept tabs or protrusions 21 of connector body 20. Alternatively, connector body 20 could have slots 21 and the shield 30 could have tabs or protrusions 33.

FIGS. 2-5 and 6-8 show additional views of the components of an assembly 10 configured to be affixed to the panel 100 by screws (not shown), namely, the connector body 20, the shield 30, the strain relief boot 40, a retaining slot 42, the cable 50, the interface connector 60, a screw boss 70 and/or a threaded insert 72 for accepting a screw, and a shield attachment 80.

The assembly 10 may also be mounted to the panel 100 by any other convenient or appropriate means. For example, FIGS. 6-8 and 12-14 illustrate an alternative embodiment wherein the assembly 10 is affixed to the panel 100 by anchor clips 75. FIGS. 6-8 and 12-14 also show additional view of the components of an assembly 10 configured to be affixed to the panel 100 by anchor clips 75, namely, the connector body 20, the shield 30, the strain relief boot 40, a retaining slot 42, the cable assembly 50, the interface connector 60, and an anchor clip 75 for engaging the panel 100.

Figure 15:
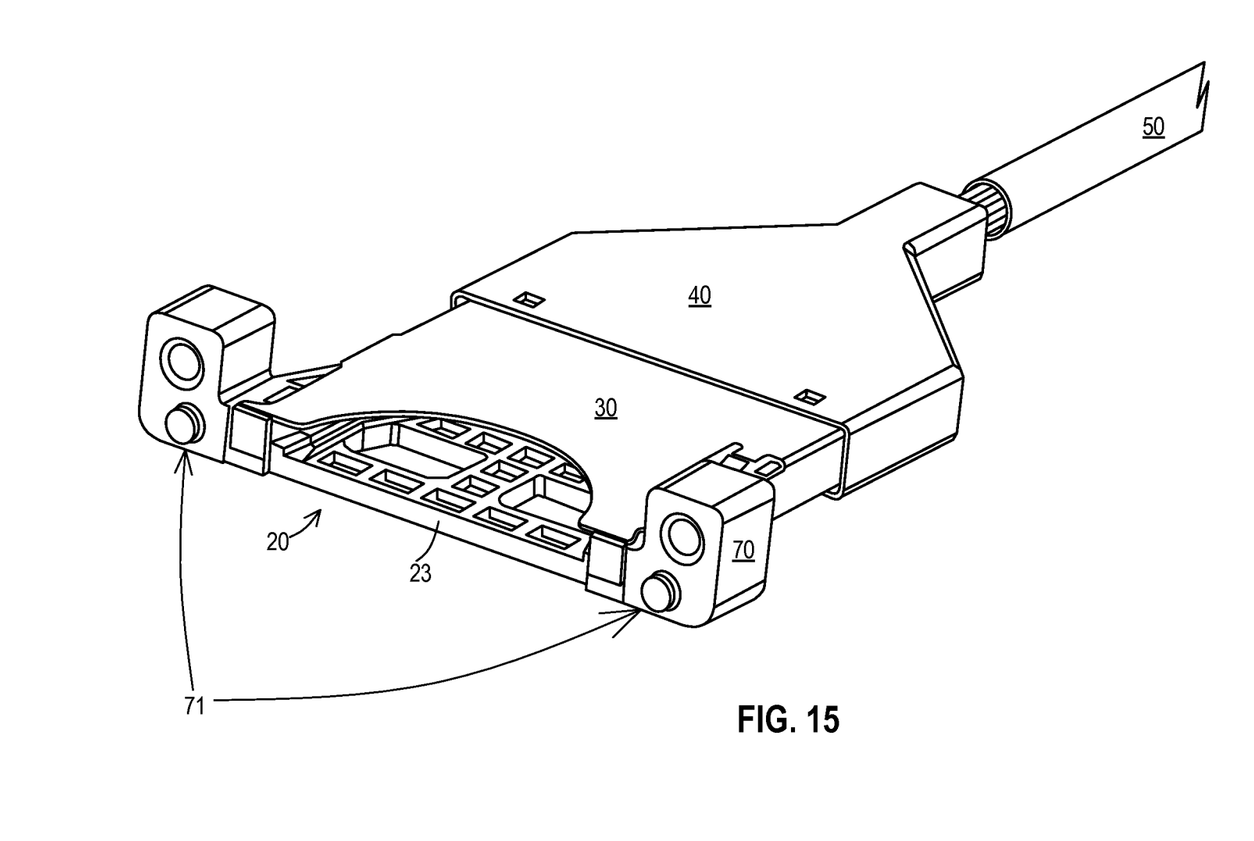
FIG. 15 illustrates a view of the connector body with a lower surface or base and protrusions on the bosses.

FIG. 15 illustrates a view of the connector body 20 which also shows a lower surface or base 23 which guides the card 90 into position and prevents it from dropping into the device 95. FIG. 15 also shows each boss 70 having a protrusion 71. The protrusions 71 serve to prevent the assembly 10 from twisting or rotating when the screws (not shown) which affix the assembly 10 to the panel 100 are tightened. Panel 100 would have complementary corresponding holes or sockets (not shown). Bosses 71 are preferred, but are not required.

Based on the foregoing, it should be appreciated that panel mount card connector assemblies have been disclosed herein. SD Cards support encryption and content protection but the disclosure herein is not limited to use with such cards, and may be used with other digital storage cards, including those which do not support encryption. Although the subject matter presented herein has been described in language specific to the embodiments disclosed herein, it is to be understood that the concepts disclosed herein are not necessarily limited to the specific embodiments and components described herein. Rather, the specific embodiments and components are disclosed as examples.

The subject matter described herein is provided by way of illustration for the purposes of teaching, suggesting, and describing, and not limiting or restricting. Combinations and alternatives to the illustrated embodiments are contemplated, described herein, and set forth in the claims. Various modifications and changes may be made to the subject matter described herein without strictly following the embodiments and applications illustrated and described, and without departing from the scope of the following claims.

The invention claimed is:

1. A digital card connector assembly for mounting to a panel having a slot whereby a digital card is inserted into the digital card connector assembly, the digital card having a plurality of electrical contacts, the digital card connector assembly comprising:
 a connector body having a plurality of electrical contacts and a plurality of retainers, the electrical contacts being configured on one end to make electrical contact with the plurality of electrical contacts of the digital card when the digital card is inserted into the digital card connector assembly and being configured on the other end to accept electrical conductors;
 a cable assembly having a plurality of electrical conductors, the electrical conductors being affixed on one end to the other end of the electrical contacts of the connector body;
 an interface connector having a plurality of electrical contacts connected to the other end of the plurality of electrical conductors of the cable assembly;
 a radio frequency (RF) shield having a plurality of retainers, some of the retainers being configured to mate with some of the retainers of the connector body, the RF shield being configured to make electrical contact with the panel when the digital card connector assembly is mounted to the panel;
 a strain relief boot having a plurality of retainers, some of the retainers being configured to mate with some of the retainers of the connector body, others of the retainers being configured to mate with others of the retainers of the RF shield, the strain relief boot being affixed to the cable assembly;
 a boss affixed to, or part of, the connector body;
 a threaded insert for the boss whereby the digital card connector assembly is configured to be affixed to the panel by a threaded fastener; and
 a shield attachment affixed to, or part of, the connector body, and configured to urge the RF shield into electrical contact with the panel.

2. A digital card connector assembly for mounting to a panel having a slot whereby a digital card is inserted into the digital card connector assembly, the digital card having a plurality of electrical contacts, the digital card connector assembly comprising:

a connector body having a plurality of electrical contacts and a plurality of retainers, the electrical contacts being configured on one end to make electrical contact with the plurality of electrical contacts of the digital card when the digital card is inserted into the digital card connector assembly and being configured on the other end to accept electrical conductors;

a cable assembly having a plurality of electrical conductors, the electrical conductors being affixed on one end to the other end of the electrical contacts of the connector body;

an interface connector having a plurality of electrical contacts connected to the other end of the plurality of electrical conductors of the cable assembly;

a radio frequency (RF) shield having a plurality of retainers, some of the retainers being configured to mate with some of the retainers of the connector body, the RF shield being configured to make electrical contact with the panel when the digital card connector assembly is mounted to the panel;

a strain relief boot having a plurality of retainers, some of the retainers being configured to mate with some of the retainers of the connector body, others of the retainers being configured to mate with others of the retainers of the RF shield, the strain relief boot being affixed to the cable assembly;

anchor clips affixed to the connector body and configured to engage the panel to secure the digital card connector assembly to the panel; and a shield attachment affixed to, or part of, the connector body, and configured to urge the RF shield into electrical contact with the panel.

3. A digital card connector assembly for mounting to a panel having a slot whereby a digital card is inserted into the digital card connector assembly, the digital card having a plurality of electrical contacts, the digital card connector assembly comprising:

a connector body having a plurality of electrical contacts configured on one end to make contact with the plurality of electrical contacts of the digital card when the digital card is inserted into the digital card connector assembly;

a cable assembly having a plurality of electrical conductors electrically connected to the plurality of electrical contacts of the connector body;

a radio frequency (RF) shield affixed to the connector body and configured to make electrical contact with the panel when the digital card connector assembly is mounted to the panel; a shield attachment affixed to, or part of, the connector body, and configured to urge the RF shield into electrical contact with the panel; a strain relief boot; and wherein: the strain relief boot has a plurality of retainers; the RF shield has a plurality of retainers configured to engage some of the retainers of the strain relief boot; and the connector body has a plurality of retainers configured to engage others of the retainers of the strain relief boot; and a threaded boss whereby the digital card connector assembly is configured to be affixed to the panel by a threaded fastener, and wherein the threaded boss has a protrusion configured to engage a corresponding hole in the panel.

4. The digital card connector assembly of claim 3 and further comprising an interface connector having a plurality of electrical contacts connected to the plurality of electrical conductors of the cable assembly.

5. The digital card connector assembly of claim 3 wherein the other end of the plurality of electrical contacts of the connector body is configured to accept the electrical conductors of the cable assembly.

6. The digital card connector assembly of claim 3 wherein:
the RF shield has a plurality of retainers; and
the connector body has a corresponding plurality of mating retainers
whereby the RF shield is affixed to the connector body.

\* \* \* \* \*